United States Patent
Yoshihashi (10) Patent No.: US 10,827,096 B2
(45) Date of Patent: Nov. 3, 2020

(54) INFORMATION PROCESSING SYSTEM, INFORMATION PROCESSING METHOD, AND INFORMATION PROCESSING APPARATUS

(71) Applicant: Ryohsuke Yoshihashi, Kanagawa (JP)

(72) Inventor: Ryohsuke Yoshihashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/575,908

(22) Filed: Sep. 19, 2019

(65) Prior Publication Data

US 2020/0162636 A1    May 21, 2020

(30) Foreign Application Priority Data

Nov. 21, 2018  (JP) ................ 2018-218668

(51) Int. Cl.
| | | |
|---|---|---|
| G06K 15/00 | (2006.01) | |
| H04N 1/44 | (2006.01) | |
| G06F 3/12 | (2006.01) | |
| H04N 1/00 | (2006.01) | |

(52) U.S. Cl.
CPC ......... *H04N 1/4433* (2013.01); *G06F 3/1222* (2013.01); *G06F 3/1238* (2013.01); *H04N 1/0048* (2013.01)

(58) Field of Classification Search
CPC .. H04N 1/4433; H04N 1/0048; G06F 3/1222; G06F 3/1224; G06F 3/1238
See application file for complete search history.

(56) References Cited

U.S. PATENT DOCUMENTS

| | | | |
|---|---|---|---|
| 9,661,184 B2 | 5/2017 | Ogawa | |
| 10,136,017 B2 | 11/2018 | Hayashi et al. | |
| 10,356,266 B2 | 7/2019 | Hayashi et al. | |
| 2004/0093528 A1* | 5/2004 | Fujiwara | H04L 63/083 726/4 |
| 2017/0094123 A1 | 3/2017 | Ogawa | |
| 2018/0060131 A1 | 3/2018 | Namihira et al. | |
| 2018/0213059 A1* | 7/2018 | Alsina | H04L 67/306 |
| 2018/0275749 A1* | 9/2018 | Yoon | G06Q 20/352 |
| 2018/0349078 A1 | 12/2018 | Yoshihashi | |

FOREIGN PATENT DOCUMENTS

| | | |
|---|---|---|
| JP | 2016-091223 | 5/2016 |
| JP | 2017-068682 | 4/2017 |

OTHER PUBLICATIONS

U.S. Appl. No. 16/297,245, filed Mar. 8, 2019.

\* cited by examiner

*Primary Examiner* — Moustapha Diaby (74) *Attorney, Agent, or Firm* — IPUSA, PLLC (57) ABSTRACT

An information processing system includes a client apparatus, and an information processing apparatus that provides a service to the client apparatus in response to a request signal. The information processing apparatus includes a first memory and a first processor coupled to the first memory and configured to transmit an error signal to the client apparatus in a case where permission to use the service is not valid with respect to the request signal. The client apparatus includes a second memory and a second processor coupled to the second memory and configured to delete, in response to the error signal, permission information stored in the client apparatus and indicating that the service is available.

4 Claims, 9 Drawing Sheets

INFORMATION PROCESSING SYSTEM, INFORMATION PROCESSING METHOD, AND INFORMATION PROCESSING APPARATUS

CROSS-REFERENCE TO RELATED APPLICATION

The present application claims priority under 35 U.S.C. § 119 to Japanese Patent Application No. 2018-218668, filed on Nov. 21, 2018, the entire contents of which are incorporated herein by reference.

BACKGROUND OF THE INVENTION

1. Field of the Invention

The disclosures herein generally relate to an information processing system, an information processing method, and an information processing apparatus.

2. Description of the Related Art

In recent years, information processing systems have been widely used, in which applications and multi-tenant services that work with external services such as online storage are utilized from multifunction peripherals. In such information processing system, in order to utilize applications and multi-tenant services that work with external services, authentication is generally required.

Patent Document 1 describes an information processing system that stores, at an initial login to a service, information on a user and a tenant to which permission for use of the service is granted, in association with a client apparatus, and uses the stored information at subsequent logins, thereby simplifying the input of information used for authentication.

However, in the information processing system described in Patent Document 1, if it is desired to associate a client apparatus, which is currently associated with a given tenant (namely, the given tenant currently has permission to use a service), with another tenant, the permission granted to the given tenant needs to be removed.

In this case, even if the permission is removed by a management unit of the information processing system, corresponding past permission information remains in data storage of a serving using apparatus. Thus, there may be a case where a user belonging to the tenant whose permission has been removed may be able to use the service by using the serving using apparatus. In order to prevent this, the user is required to remove the past permission information by using an operation unit of the client apparatus, which may be troublesome.

RELATED-ART DOCUMENTS

Patent Documents

Patent Document 1: Japanese Unexamined Patent Application Publication No. 2016-091223

SUMMARY OF THE INVENTION

According to an embodiment of the present invention, an information processing system includes a client apparatus, and an information processing apparatus that provides a service to the client apparatus in response to a request signal. The information processing apparatus includes a first memory and a first processor coupled to the first memory and configured to transmit an error signal to the client apparatus in a case where permission to use the service is not valid with respect to the request signal. The client apparatus includes a second memory and a second processor coupled to the second memory and configured to delete, in response to the error signal, permission information stored in the client apparatus and indicating that the service is available.

DESCRIPTION OF THE EMBODIMENTS

It is a general object of the present invention to simplify the removal of a tenant's permission to use a service from a client apparatus.

In the following, embodiments of the present invention will be described with reference to the accompanying drawings.

<Configuration of Information Processing System According to Embodiment>

Figure 1:
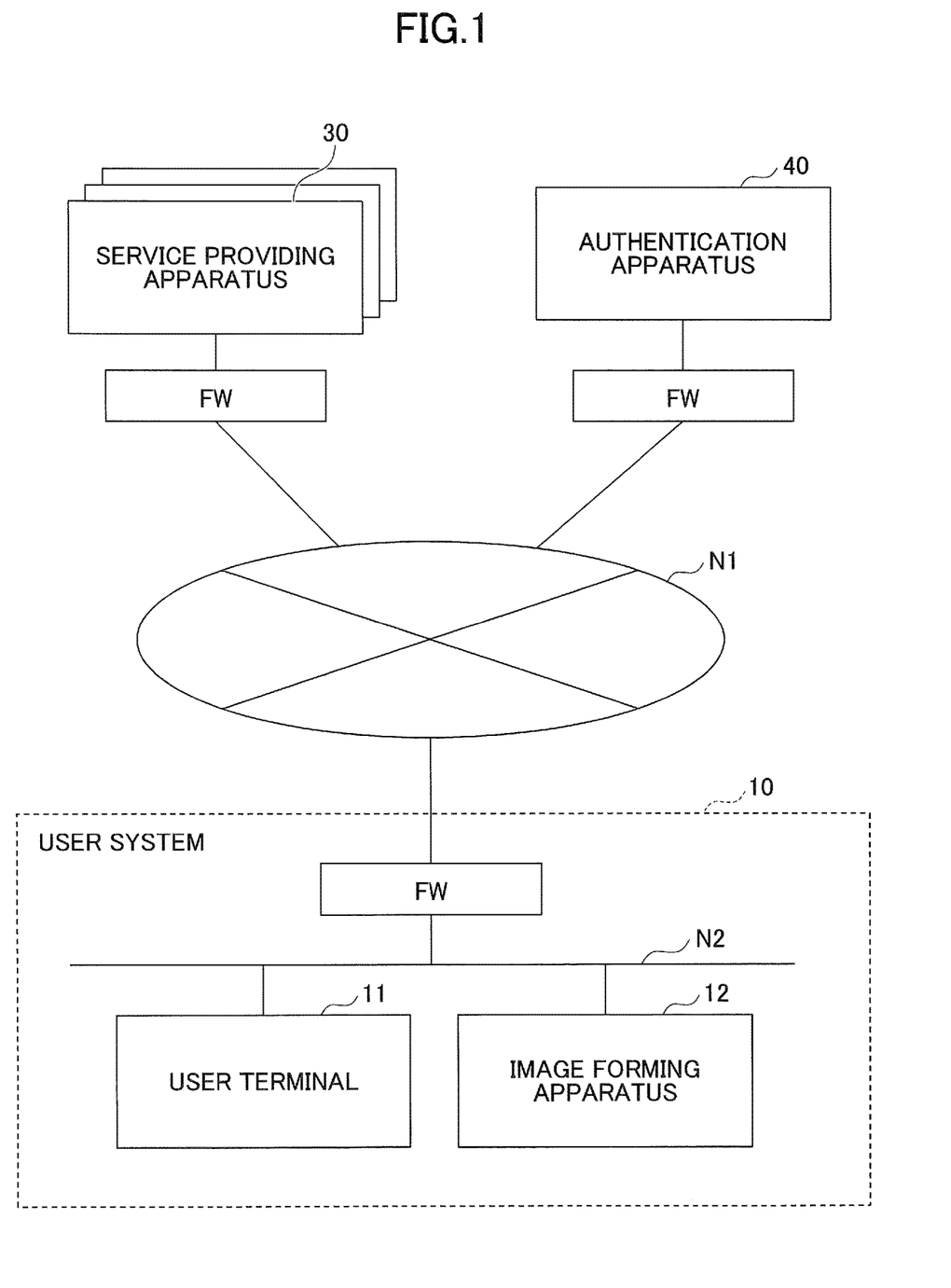
FIG. 1 is a diagram illustrating an example of a configuration of an information processing system according to an embodiment.

FIG. 1 is a diagram illustrating an example of a configuration of an information processing system according to an embodiment. An information processing system 1 illustrated in FIG. 1 includes a user system 10, a service providing apparatus 30, and an authentication apparatus 40.

The user system 10, the service providing apparatus 30, and the authentication apparatus 40 are coupled to each other via a network N1 such as the Internet.

A network N2 of the user system 10 is a private network located inside of a firewall FW. The firewall FW detects and blocks unauthorized access. A user terminal 11 and an image forming apparatus 12 such as a multifunction peripheral are connected to the network N2. The user terminal 11 and the image forming apparatus 12 each are an example of a "client apparatus" by which a user uses a service or uses the service on a trial basis.

The user terminal 11 may be implemented by an information processing apparatus on which a general operating system (OS) is installed. The user terminal 11 includes a wireless communication means or a wired communication means. The user terminal 11 may be a terminal operable by a user, such as a smartphone, a mobile phone, a tablet terminal, or a personal computer (PC).

The image forming apparatus 12 is an apparatus that includes an image forming function, such as a multifunction peripheral. The image forming apparatus 12 includes a wireless communication means or a wired communication means. The image forming apparatus 12 is an apparatus that includes a browser and performs processes related to image formation. In the example of FIG. 1, a single user terminal 11 and a single image forming apparatus 12 are illustrated as an example; however, a plurality of user terminals 11 and a plurality of image forming apparatuses 12 may be used.

As long as a communication function is included, the user terminal 11 and the image forming apparatus 12 may each be a projector, an interactive whiteboard (IWB: a whiteboard having an electronic blackboard function capable of interactive communication), an output apparatus such as digital signage, a head-up display (HUD) apparatus, an industrial machine, an imaging apparatus, a sound collector, medical equipment, a network home appliance, a vehicle (a connected car), a notebook PC, a mobile phone, a smartphone, a tablet terminal, a game console, a personal digital assistant (PDA), a digital camera, a wearable PC, or a desktop PC.

The service providing apparatus 30 is connected to the network N1 via a firewall FW. The service providing apparatus 30 provides various services to the user terminal 11 and the image forming apparatus 12. The service providing apparatus 30 may be implemented by one or more information processing apparatuses, on each of which a general OS is installed.

The services provided by the service providing apparatus 30 may be services provided by external service providers. Examples of the services provided by the service providing apparatus 30 include a translation service. In a case where the translation service is used, the image forming apparatus 12 may perform optical character recognition (OCR) on image data that has been scanned from a document, and transmit the image data to the service providing apparatus 30. Subsequently, a user may view translated results by accessing the service providing apparatus 30 from the user terminal 11, or may receive translated results by an electronic mail, for example.

The authentication apparatus 40 is connected to the network N1 via a firewall FW. The authentication apparatus 40 may be implemented by one or more information processing apparatuses, on each of which a general OS is installed.

The authentication apparatus 40 may have functions such as an authentication/authorization function, a tenant/user management function, a license management function, and an account registration function. The authentication apparatus 40 may receive an account registration request, a login request, and a service provision request from the user terminal 11 or the image forming apparatus 12.

The configuration of the information processing system 1 illustrated in FIG. 1 is merely an example, and the information processing system 1 may have another configuration.

<Hardware Configuration of Computer According to Embodiment>

Figure 2:
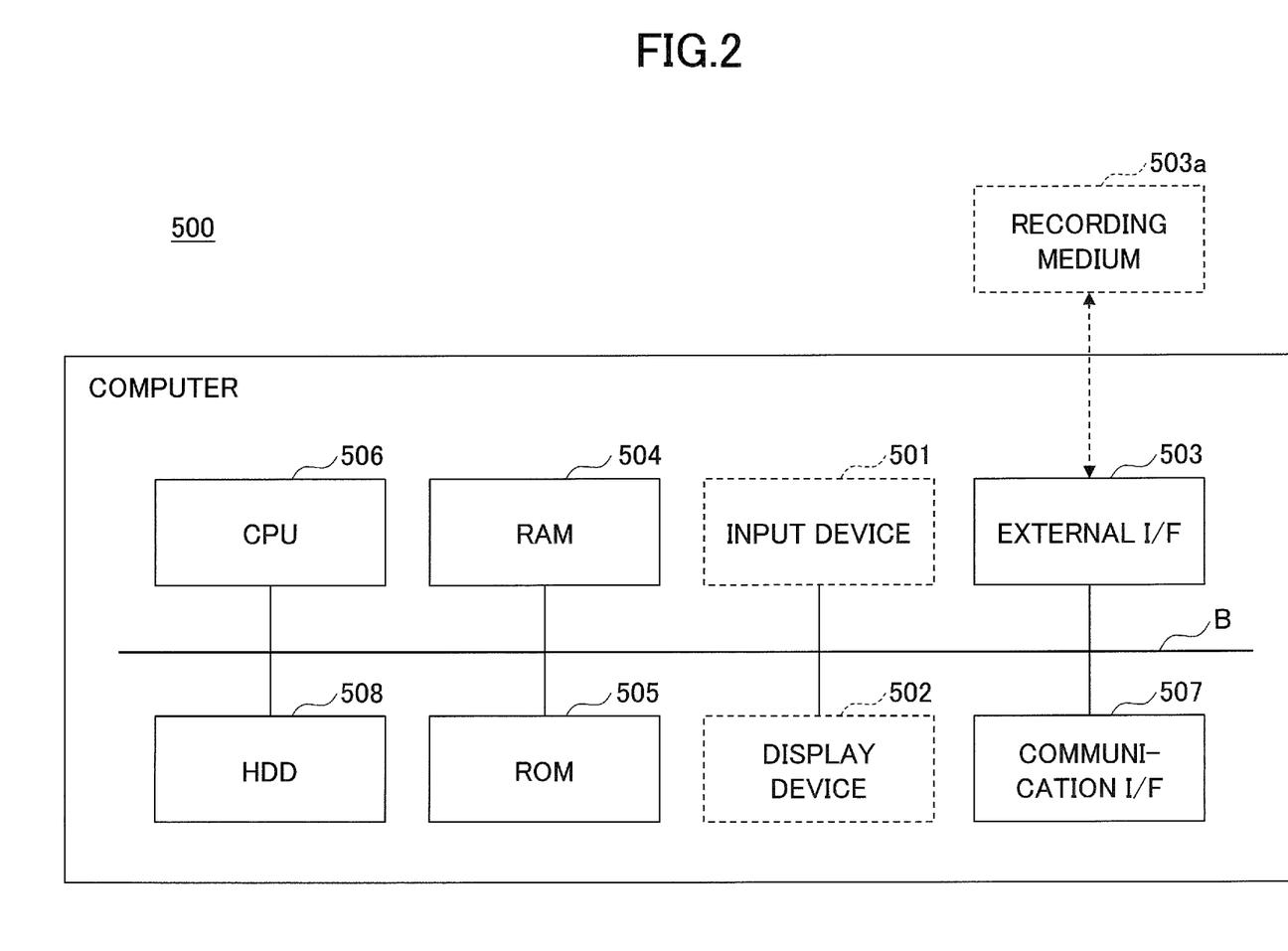
FIG. 2 is a block diagram illustrating an example of a hardware configuration of a computer according to the embodiment.

The user terminal 11 illustrated in FIG. 1 may be implemented by a computer having a hardware configuration illustrated in FIG. 2, for example. Further, the information processing apparatuses implementing the service providing apparatus 30 and the authentication apparatus 40 illustrated in FIG. 1 may be implemented by the computer having the hardware configuration illustrated in FIG. 2, for example.

FIG. 2 is a block diagram illustrating an example of the hardware configuration of the computer according to the embodiment.

A computer 500 illustrated in FIG. 2 includes an input device 501, a display device 502, an external interface (I/F) 503, a random-access memory (RAM) 504, a read-only memory (ROM) 505, a central processing unit (CPU) 506, a communication interface (I/F) 507, and a hard disk drive (HDD) 508, which are coupled to each other via a bus B. Further, the input device 501 and the display device 502 may be coupled to the bus B when necessary.

The input device 501 includes a keyboard and a mouse, and is used by the user to input various operation signals. The display device 502 includes a display, and displays processing results obtained by the computer 500.

The external I/F 503 is an interface with an external device. The external device may be a recording medium 503a. With this configuration, the computer 500 can read from and write to the recording medium 503a via the external I/F 503. Examples of the recording medium 503a include a flexible disk, a compact disk (CD), a digital versatile disk (DVD), a secure digital (SD) memory card, and a universal serial bus (USB) memory.

The RAM 504 is a volatile semiconductor memory (a storage device) that temporarily stores programs and data. The ROM 505 is a non-volatile semiconductor memory (a storage device) that can retain programs and data even when the power is turned off. The ROM 505 stores programs and data such as a basic input/output system (BIOS), which is executed when the computer 500 is started, OS settings, and network settings.

The CPU 506 is an arithmetic unit that implements control and functions of the entire computer 500 by reading programs and data from a storage device such as the ROM 505 or the HDD 508 into the RAM 504 and performing processes.

The communication I/F 507 is an interface that connects the computer 500 to the networks N1 and N2. With this configuration, the computer 500 can perform data communication via the communication I/F 507.

The HDD 508 is a non-volatile storage device that stores programs and data. The programs and data stored in the HDD 508 include an OS, which is basic software controlling the entire computer 500, and application software running on the OS and providing various functions. Instead of the HDD 508, a solid state drive (SSD) may be included in the computer 500.

With the above-described hardware configuration of the computer 500, the information processing apparatuses implementing the service providing apparatus 30 and the authentication apparatus 40 according to the embodiment can implement various types of functions, which will be described below.

<Hardware Configuration of Image Forming Apparatus According to Embodiment>

Figure 3:
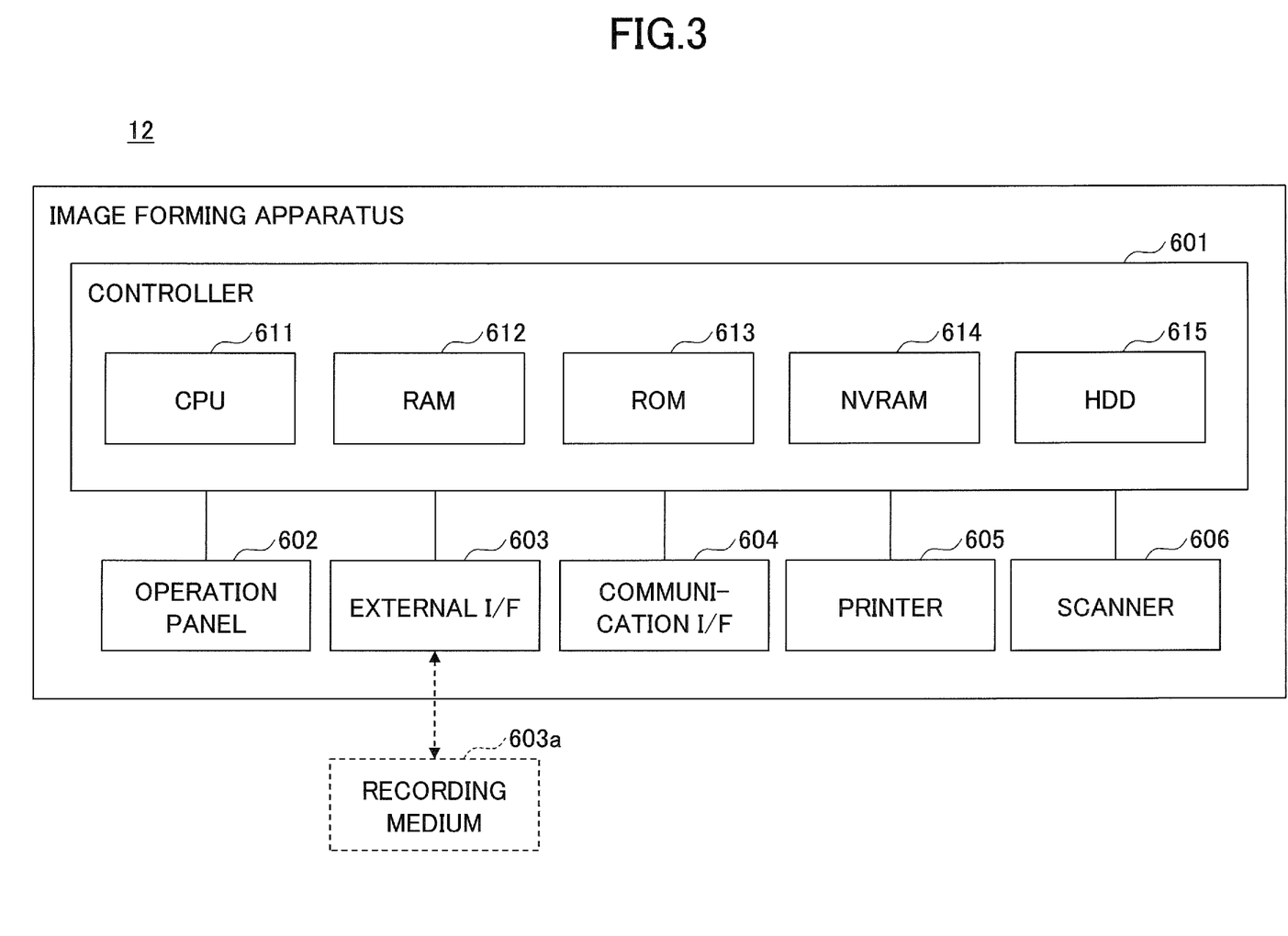
FIG. 3 is a block diagram illustrating an example of a hardware configuration of an image forming apparatus according to the embodiment.

The image forming apparatus 12 may be implemented by a computer having a hardware configuration as illustrated in FIG. 3, for example. FIG. 3 is a block diagram illustrating an example of a hardware configuration of the image forming apparatus according to the embodiment. The image forming apparatus 12 illustrated in FIG. 3 includes a controller 601, an operation panel 602, an external I/F 603, a communication I/F 604, a printer 605, and a scanner 606.

The controller 601 includes a CPU 611, a RAM 612, a ROM 613, a NVRAM (non-volatile random-access memory) 614, and a HDD 615. The ROM 613 stores various types of programs and data. The RAM 612 temporarily stores programs and data. The NVRAM 614 stores setting information, for example. The HDD 615 stores various programs and data.

The CPU 611 implements control and functions of the entire image forming apparatus 12 by reading programs, data, and setting information from the ROM 613, the NVRAM 614, and the HDD 615 into the RAM 612 and performing processes.

The operation panel 602 includes an input unit that receives input from a user and a display unit that displays data. The external I/F 603 is an interface with an external device. The external device may be a recording medium 603a. With this configuration, the image forming apparatus 12 can read from and write to the recording medium 603a via the external I/F 603. Examples of the recording medium 603a include an IC card, a flexible disk, a CD, a DVD, a SD memory card, and a USB memory.

The communication interface (I/F) 604 is an interface that connects the image forming apparatus 12 to the network N2. With this configuration, the image forming apparatus 12 can perform data communication via the communication I/F 604. The printer 605 is a printing device that prints print data on paper. The scanner 606 is a reading device that reads image data (electronic data) from a document. A description of hardware configurations of the firewalls FW illustrated in FIG. 1 will be omitted.

First Embodiment

Next, functional configurations of the image forming apparatus 12, the authentication apparatus 40, and the service providing apparatus 30 according to a first embodiment will be described.

<Functional Configuration of Image Forming Apparatus According to First Embodiment>

Figure 4:
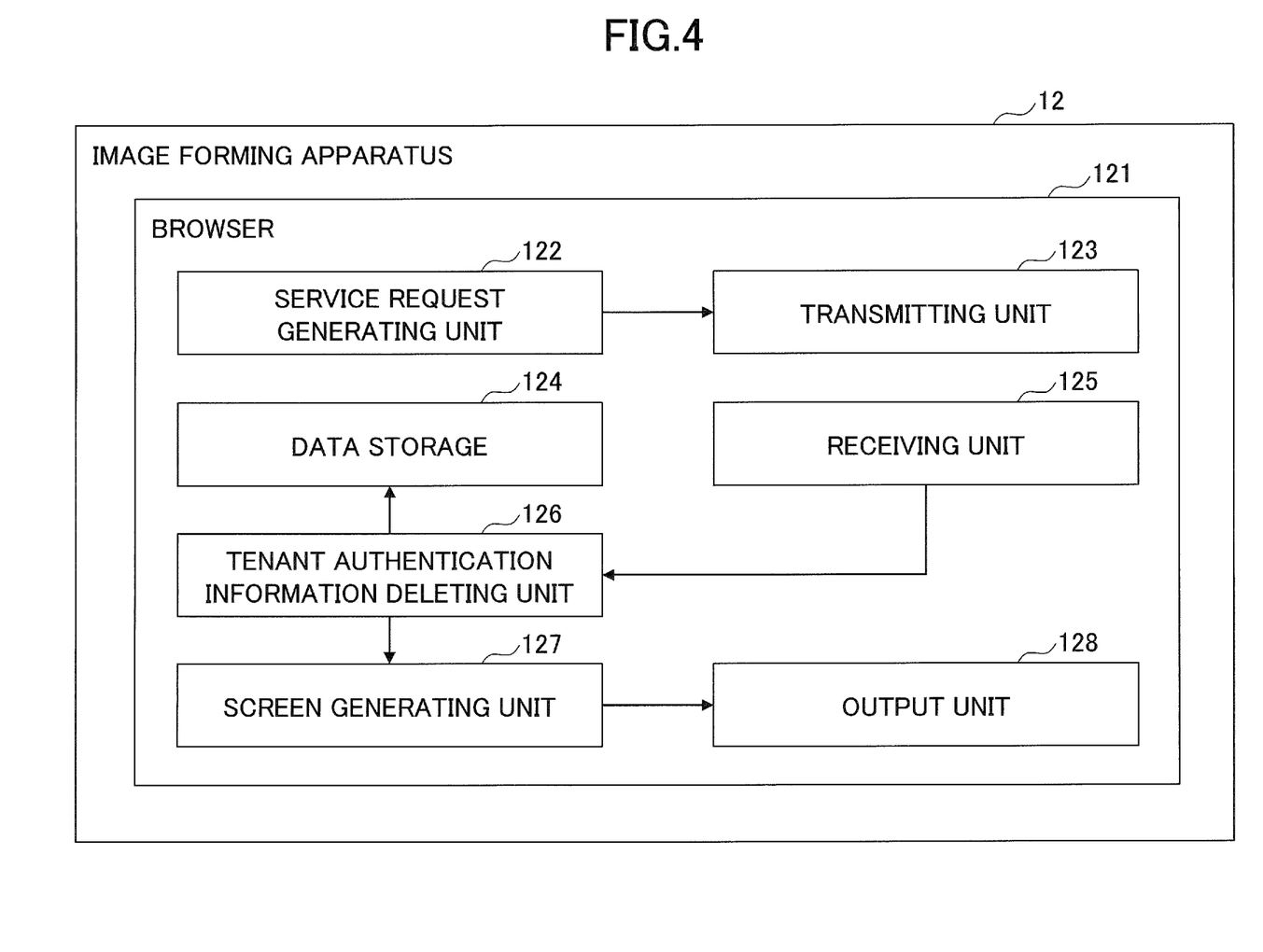
FIG. 4 is a block diagram illustrating an example of a functional configuration of the image forming apparatus according to a first embodiment.

The above-described image forming apparatus 12 may be implemented by a functional configuration illustrated in FIG. 4, for example. FIG. 4 is a block diagram illustrating an example of the functional configuration of the image forming apparatus according to the first embodiment.

A browser 121 is installed on the image forming apparatus 12. The browser 121 of the image forming apparatus 12 includes a service request generating unit 122, a transmitting unit 123, a data storage 124, a receiving unit 125, a tenant authentication information deleting unit 126, a screen generating unit 127, and an output unit 128.

The service request generating unit 122 generates a service request signal for requesting the service providing apparatus 30 to provide a service, and outputs the service request signal to the transmitting unit 123. For example, the service request signal may include a cookie, an authentication ticket, and a flag indicating that the client apparatus is an image forming apparatus. If the client apparatus is a PC, the inclusion of a flag is not required.

When the service request signal is input into the transmitting unit 123, the transmitting unit 123 outputs the service request signal to the authentication apparatus 40. The transmitting unit 123 is an example of a "request signal transmitting unit".

The data storage 124 stores tenant authentication information. A tenant represents a group (an organization) such as a company or a department.

The tenant authentication information in the data storage 124 associates a user, who belongs to a tenant, with the image forming apparatus 12. Thus, the user can use the image forming apparatus 12 to utilize a service provided by the service providing apparatus 30. The tenant authentication information is an example of "permission information".

The receiving unit 125 receives an error signal (described later) from the service providing apparatus 30 via the authentication apparatus 40 with respect to the service request signal, and outputs the error signal to the tenant authentication information deleting unit 126.

When the error signal is input into the tenant authentication information deleting unit 126, the tenant authentication information deleting unit 126 deletes tenant authentication information stored in the data storage 124. In addition, the tenant authentication information deleting unit 126 outputs, to the screen generating unit 127, a deletion notification indicating that the tenant authentication information has been deleted.

When the tenant authentication information is deleted from the data storage 124, the user belonging to the tenant becomes unable to use, from the image forming device 12, the service provided by the service providing apparatus 30. The tenant authentication information deleting unit 126 is an example of a "permission information deleting unit".

Figure 5:
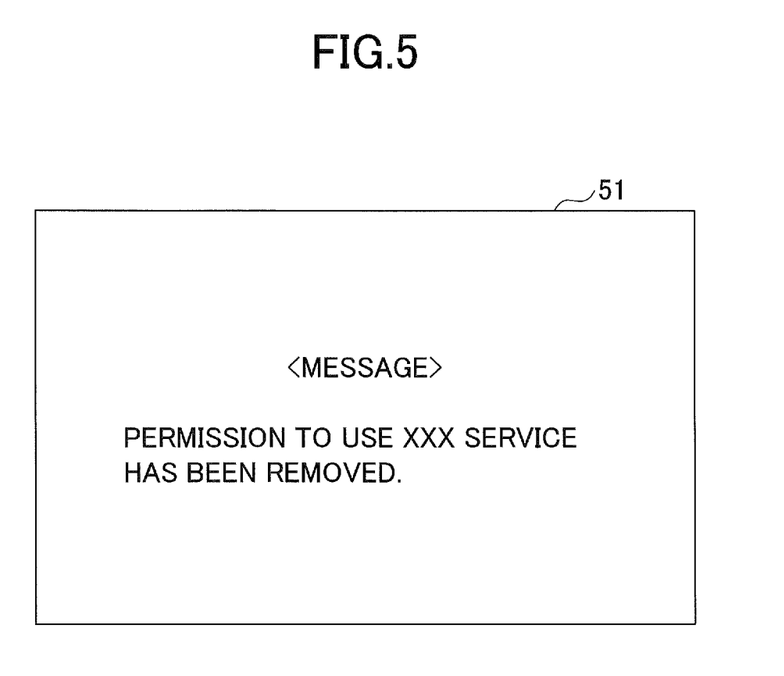
FIG. 5 is a diagram illustrating an example of a screen displaying a message indicating that permission to use a service has been removed.

In response to the deletion notification, the screen generating unit 127 of the image forming apparatus 12 generates a screen displaying a message indicating that permission to use the service has been removed. FIG. 5 is a diagram illustrating an example of a screen 51 displaying the message indicating that permission to use the service has been removed. The screen generating unit 127 outputs the screen 51 displaying the message to the output unit 128, and the output unit 128 outputs the screen 51 to the operation panel 602 for display.

In the present embodiment, the functional configuration of the image forming apparatus has been described as an example of the client apparatus. If the client apparatus is the user terminal 11, the functional configuration illustrated in FIG. 4 is included in the user terminal 11 as well. Further, the functional configuration of the user terminal 11 is implemented by the hardware configuration illustrated in FIG. 2.

<Functional Configuration of Authentication Apparatus According to First Embodiment>

Figure 6:
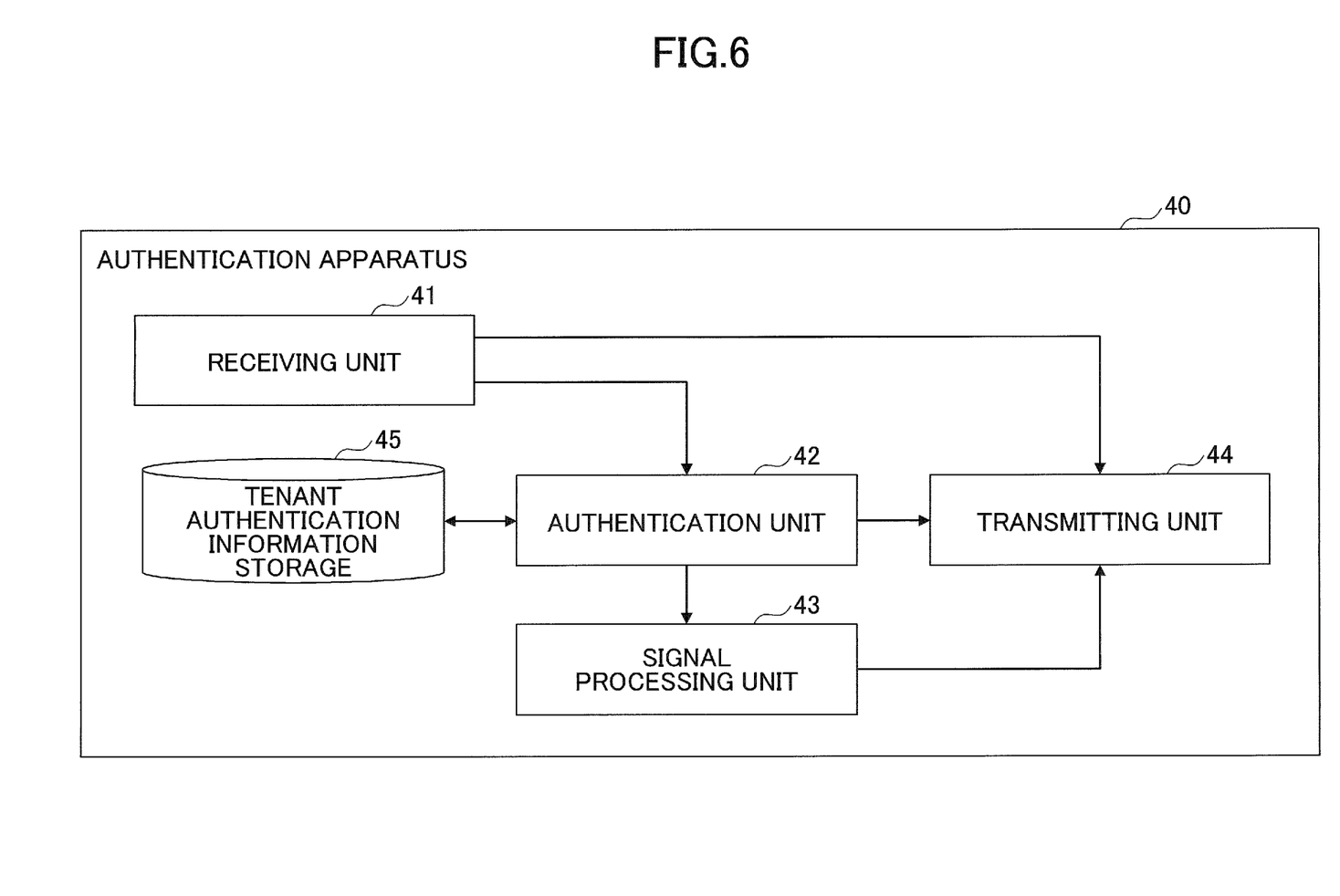
FIG. 6 is a block diagram illustrating an example of a functional configuration of an authentication apparatus according to the first embodiment.

Next, the authentication apparatus 40 may be implemented by functional blocks illustrated in FIG. 6, for example. FIG. 6 is a block diagram illustrating an example of a functional configuration of the authentication apparatus 40 according to the first embodiment. The authentication apparatus 40 implements the functional blocks as illustrated in FIG. 6 by executing a program.

The authentication apparatus 40 illustrated in FIG. 6 includes a receiving unit 41, an authentication unit 42, a signal processing unit 43, a transmitting unit 44, and a tenant authentication information storage 45.

The receiving unit 41 outputs a service request signal, which has been received from the image forming apparatus 12, to the authentication unit 42. Further, the receiving unit 41 outputs an error signal, which has been received from the service providing apparatus 30, to the image forming apparatus 12 via the transmitting unit 44.

The authentication unit 42 performs an authentication process in response to the service request signal received from the image forming apparatus 12. The authentication unit 42 accesses the tenant authentication information storage 45 based on an authentication ticket, and authenticate whether a tenant to which the user belongs has permission to use a service, which is to be provided by the service providing apparatus 30, by using the image forming apparatus 12. If the user does not have valid permission, the authentication unit 42 outputs the service request signal to the signal processing unit 43. Conversely, if the user has valid permission, the authentication unit 42 outputs the service request signal to the transmitting unit 44.

When the service request signal is input into the signal processing unit 43, the signal processing unit 43 deletes the authentication ticket from the service request signal. The signal processing unit 43 outputs the service request signal, from which the authentication ticket has been deleted, to the transmitting unit 44.

When the service request signal is input into the transmitting unit 44 from the authentication unit 42 or the signal processing unit 43, the transmitting unit 44 transmits the service request signal to the service providing apparatus 30. The transmitting unit 44 is an example of an "authentication information transmitting unit".

If it is desired to associate the image forming apparatus 12, which is currently associated with a given tenant (namely, the given tenant currently has permission to use a service), with another tenant, the permission granted to the given tenant would need to be removed.

In this case, even if a management unit (not illustrated) of the information processing system 1 deletes tenant information stored in the tenant authentication information storage 45 such that the permission is removed, corresponding tenant authentication information stored in the data storage 124 of the image forming apparatus 12 will not be deleted and remains in the tenant authentication information storage 45.

In this case, because the corresponding tenant authentication information is still stored in the data storage 124, the user belonging to the tenant whose permission has been removed may be able to use the service provided by the service providing apparatus 30. In order to prevent this, the user would be required to delete the corresponding tenant authentication information through the operation panel 602 of the image forming apparatus 12.

<Functional Configuration of Service Providing Apparatus According to First Embodiment>

Figure 7:
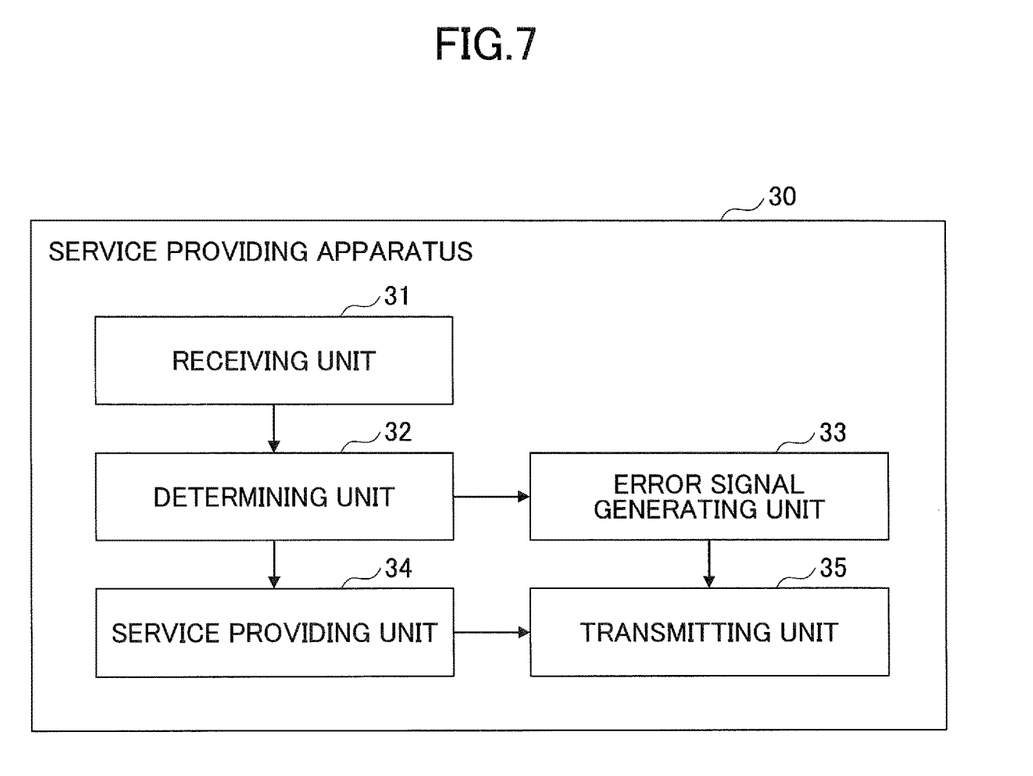
FIG. 7 is a block diagram illustrating an example of a functional configuration of a service providing apparatus according to the first embodiment.

For example, the service providing apparatus 30 may be implemented by a functional configuration illustrated in FIG. 7. FIG. 7 is a block diagram illustrating an example of the functional configuration of the service providing apparatus 30 according to the first embodiment. The service providing apparatus 30 implements the functional blocks as illustrated in FIG. 7 by executing a program.

The service providing apparatus 30 includes a receiving unit 31, a determining unit 32, an error signal generating unit 33, a service providing unit 34, and a transmitting unit 35.

The receiving unit 31 outputs a service request signal, which has been received from the authentication apparatus 40, to the determining unit 32.

The determining unit 32 determines whether an authentication ticket is included in the service request signal. If the determining unit 32 determines that the authentication ticket is not included, the determining unit 32 outputs a non-permission notification to the error signal generating unit 33. In response to the non-permission notification, the error signal generating unit 33 generates an error signal, and outputs the error signal to the transmitting unit 35.

Conversely, if the determining unit 32 determines that the authentication ticket is included in the service request signal, the determining unit 32 outputs a permission notification to the service providing unit 34. In response to the permission notification, the service providing unit 34 outputs service information to the transmitting unit 35.

When the error signal or the service information is input into the transmitting unit 35, the transmitting unit 35 transmits the error signal or the service information to the image forming apparatus 12 via the authentication apparatus 40. The transmitting unit 35 is an example of an "error signal transmitting unit".

<Operation of Information Processing System According to First Embodiment>

Figure 8:
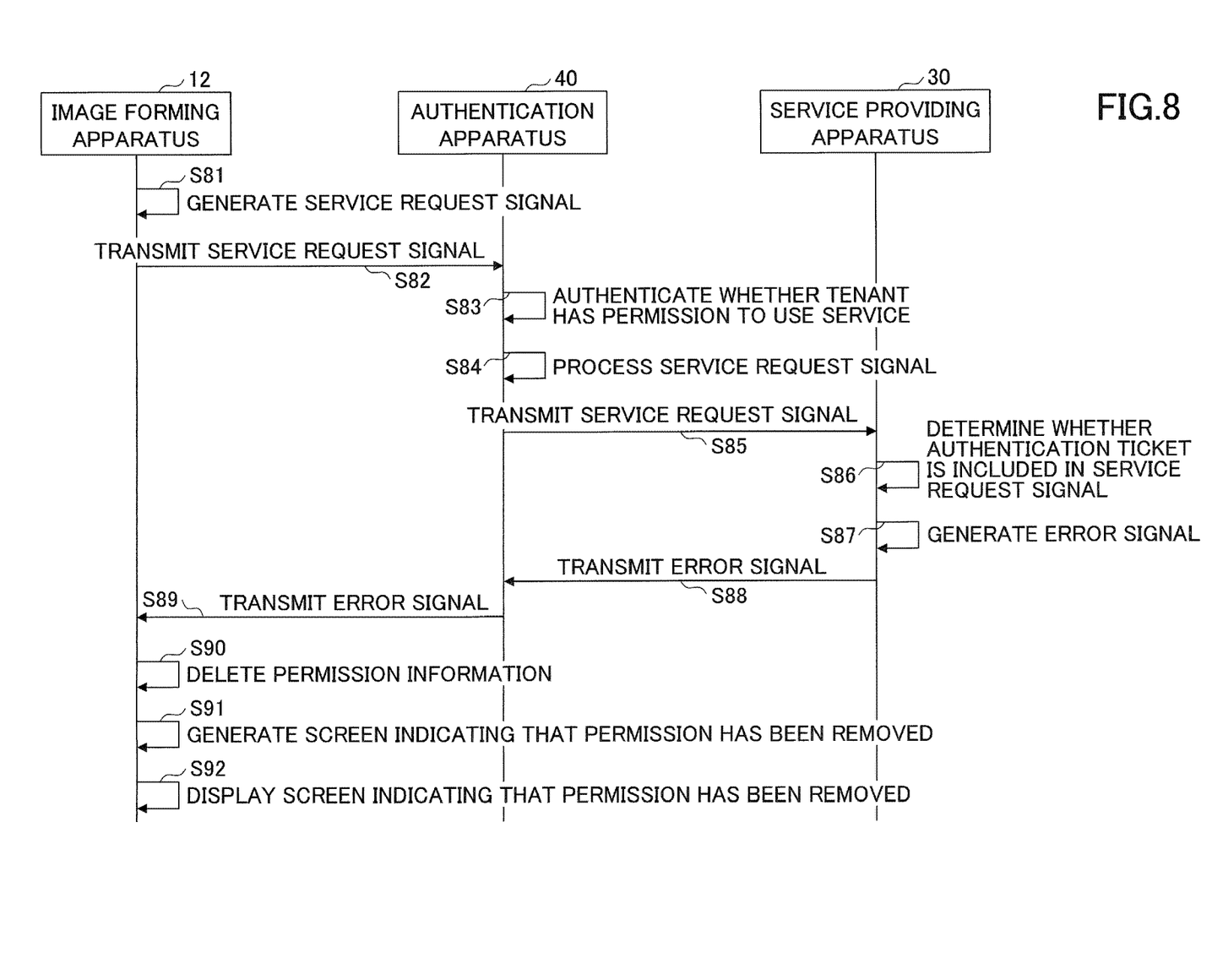
FIG. 8 is a sequence diagram illustrating an example of the operation of an information processing system according to the first embodiment.

FIG. 8 is a sequence diagram illustrating an example of the operation of the information processing system 1 according to the first embodiment.

First, in step S81, the service request generating unit 122 of the image forming apparatus 12 generates a service request signal, and outputs the generated service request signal to the transmitting unit 123.

Next, in step S82, the transmitting unit 123 transmits the service request signal to the authentication apparatus 40.

Next, in step S83, the authentication unit 42 of the authentication apparatus 40 performs an authentication process in response to the service request signal received via the receiving unit 41. The authentication unit 42 accesses the tenant authentication information storage 45, and authenticates whether a tenant to which a user belongs has permission to use, from the image forming apparatus 12, a service provided by the service providing apparatus 30. If the authentication unit 42 determines that the tenant does not have valid permission, the authentication unit 42 outputs the service request signal to the signal processing unit 43. Conversely, if the authentication unit 42 determines that the tenant has valid permission, the authentication unit 42 outputs the service request signal to the transmitting unit 44.

Next in step S84, the signal processing unit 43 deletes an authentication ticket from the service request signal, and outputs, to the transmitting unit 44, the service request signal from which the authentication ticket has been deleted.

Next, in step S85, the transmitting unit 44 transmits the service request signal to the service providing apparatus 30.

Next, in step S86, the determining unit 32 of the service providing apparatus 30 determines whether an authentication ticket is included in the service request signal. If the determining unit 32 determines that the authentication ticket is included in the service request signal, the determining unit 32 outputs a non-permission notification to the error signal generating unit 33.

Next, in step S87, the error signal generating unit 33 generates an error signal in response to the non-permission notification, and outputs the generated error signal to the transmitting unit 35.

Next, in step S88, the transmitting unit 35 transmits the error signal to the authentication apparatus 40.

Next, in step S89, the transmitting unit 44 of the authentication apparatus 40 transmits the error signal, which has been transmitted from the service providing apparatus 30 and received by the receiving unit 41, to the image forming apparatus 12.

Next, in step S90, the tenant authentication information deleting unit 126 deletes tenant authentication information stored in the data storage 124, in response to the error signal transmitted from the authentication apparatus 40 and received by the receiving unit 125. Further, the tenant authentication information deleting unit 126 outputs, to the screen generating unit 127, a deletion notification indicating that the tenant authentication information has been deleted from the data storage 124.

Next, in step S91, in response to the deletion notification, the screen generating unit 127 generates the screen 51 displaying a message indicating that permission to use the service from the image forming apparatus 12 has been removed, and outputs the screen 51 to the output unit 128.

Next, in step S92, the output unit 128 outputs the screen 51 displaying the message to the operation panel 602 for display.

In this manner, the past corresponding tenant authentication information (permission information) stored in the data storage 124 of the image forming apparatus 12 can be deleted. Thus, it becomes possible to avoid a situation in which a service provided by the service providing apparatus 30 can be used by a user belonging to a tenant whose permission has been removed.

If a service is requested for the first time (at an initial request), tenant authentication information is not stored in the data storage 124, and thus an authentication ticket is not included in a service request signal. Therefore, as described above, in response to the service request signal, the service providing apparatus 30 transmits an error signal. However, in this case, a login screen is displayed on the operation panel 602, and a login process is performed. Details of the login process are described in Japanese Unexamined Patent Application Publication No. 2017-68682, and thus a description thereof is omitted herein.

Although not illustrated in FIG. 8, in a case where the determining unit 32 determines that an authentication ticket is included in the service request signal in step S86 of FIG. 8, the determining unit 32 outputs a permission notification to the service providing unit 34. In response to the permission notification, the service providing unit 34 outputs service information to the transmitting unit 35. The transmitting unit 35 transmits the service information to the image forming apparatus 12 via the authentication apparatus 40. Accordingly, a user belonging to a tenant, having permission to use a service provided by the service providing apparatus 30, is able to use the service from the image forming apparatus 12.

<Effects>

As described above, according to the present embodiment, the service providing apparatus 30 transmits an error signal to a serving using apparatus in a case where the permission to use a service is not valid, in response to a service request signal. The image forming apparatus 12 deletes permission information stored in the data storage 124, in response to the error signal. Accordingly, it becomes possible to avoid a situation in which a user belonging to a tenant whose permission has been removed is able to use a service provided by the service providing apparatus 30. Further, deletion of the permission information by the user through an operation unit of the serving using apparatus is not required, thus simplifying the removal of permission.

Further, according to the present embodiment, if an authentication ticket is included in a service request signal and the authentication ticket indicates that a service is not available, the authentication apparatus 40 deletes the authentication ticket from the service request signal. Further, if the service request signal does not include the authentication ticket, the service providing apparatus 30 transmits an error signal to the image forming apparatus 12.

The above-described function can be implemented by a function for transmitting an error signal by the service providing apparatus 30 when a service is requested for the first time. Therefore, the above-described effect can be obtained at a low cost, without adding a new configuration or a new function.

Further, the information processing system 1 according to the present embodiment includes the output unit that outputs information indicating that permission information has been deleted. Accordingly, it is possible for a user, who belongs to a tenant whose permission has been removed, to visually recognize that the service provided by the service providing apparatus 30 has become no longer available from the image forming apparatus 12. Thus, the convenience of the information processing system 1 can be enhanced.

Second Embodiment

Next, an information processing apparatus according to a second embodiment will be described. A description of the same elements as those of the above-described embodiment will be omitted.

An information processing apparatus 50 according to the second embodiment includes both the functions of the authentication apparatus 40 and the functions of the service providing apparatus 30 according to the first embodiment.

Figure 9:
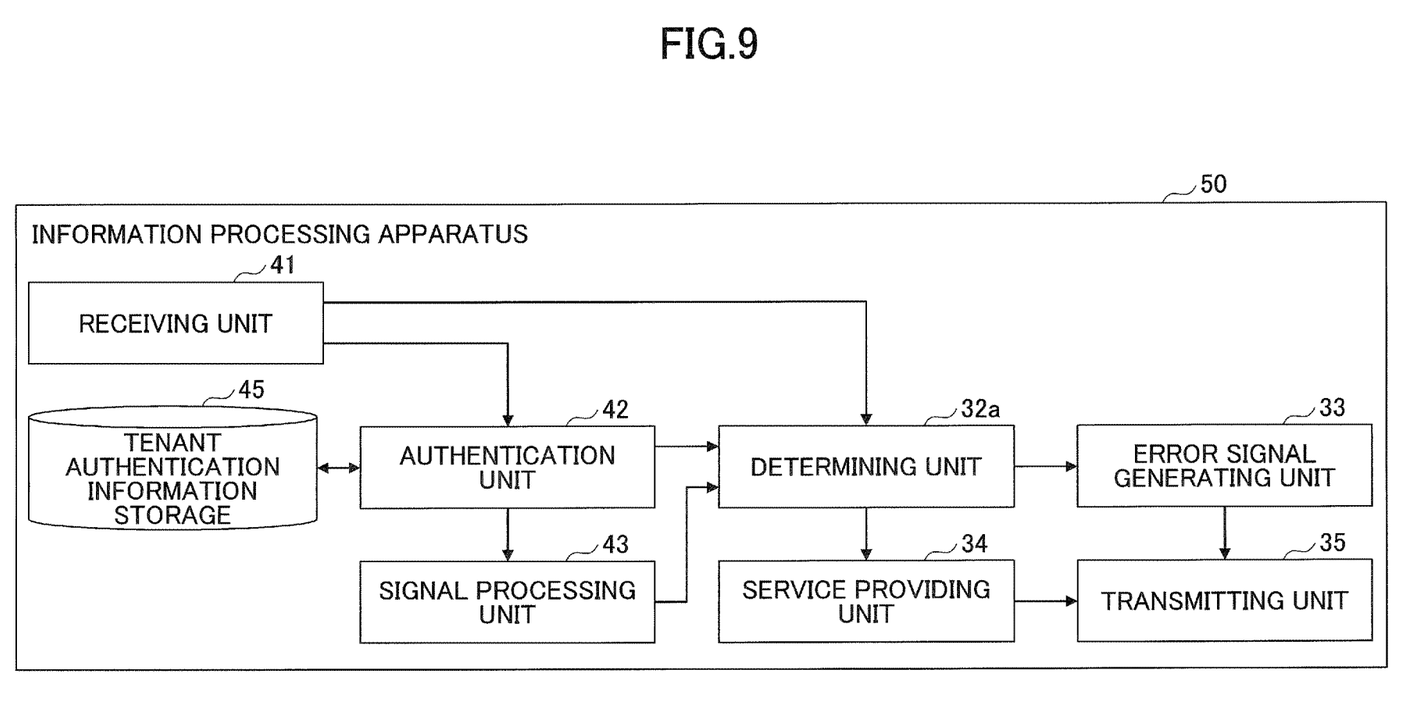
FIG. 9 is a block diagram illustrating an example of a functional configuration of an information processing apparatus according to a second embodiment.

FIG. 9 is a block diagram illustrating an example of a functional configuration of the information processing apparatus 50 according to the second embodiment. The information processing apparatus 50 includes a determining unit 32a.

The authentication unit 42 inputs a service request signal into the determining unit 32a, and the signal processing unit 43 inputs, into the determining unit 32a, a service request signal from which an authentication ticket has been deleted. The determining unit 32a determines whether the authentication ticket is included in the service request signal. If the determining unit 32a determines that the authentication ticket is not included, the determining unit 32a outputs a non-permission notification to the error signal generating unit 33. Conversely, if the determining unit 32a determines that the authentication ticket is included, the determining unit 32a outputs a permission notification to the service providing unit 34.

In the information processing apparatus 50, if the authentication ticket included in the service request signal indicates that the service is unavailable, the authentication ticket is deleted from the service request signal. If the authentication ticket is not included in the service request signal, an error signal is transmitted.

Accordingly, it is possible to avoid a situation in which a user belonging to a tenant whose permission has been removed is able to use, from a client apparatus such as the image forming apparatus, a service provided by the information processing apparatus 50.

Further, according to an embodiment, an information processing method is included. For example, the information processing method is performed by an information processing system that includes a client apparatus, and an information processing apparatus that provides a service to the client apparatus in response to a request signal. The information processing method includes transmitting, by the information processing apparatus, an error signal to the client apparatus in a case where permission to use the service is not valid, in response to the request signal, and deleting, by the client apparatus, permission information, stored in the client apparatus, that indicates that the service is available, in response to the error signal. According to the information processing method, a similar effect to that of the above-described information processing apparatus can be obtained.

Further, according to an embodiment, a program is included. For example, the program is expected by an information processing apparatus that provides a service to a client apparatus in response to a request signal. The program causes a computer to serve as an error signal transmitting unit configured to transmit an error signal to the client apparatus in a case where permission to use the service is not valid, and to serve as an authentication information transmitting unit configured to transmit authentication information to the error signal transmitting unit in response to the request signal. The authentication information indicates whether the permission to use the service is valid. According to the program, a similar effect to that of the above-described information processing apparatus can be obtained.

According to at least one embodiment, it is possible to simplify the removal of a tenant's permission to use a service from a client apparatus.

Further, the functions of the above-described embodiments may be implemented by one or more processing circuits. The processing circuits include devices such as a processor programmed to cause software to execute the functions, such as a processor implemented by an electronic circuit, and an application-specific integrated circuit (ASIC), a digital signal processor (DSP), a field-programmable gate array (FPGA), and a circuit module designed to execute the above-described functions.

Further, the present invention is not limited to the above-described embodiments, and variations and modifications may be made without departing from the scope of the present invention.

What is claimed is:

1. An information processing system comprising:
a client apparatus; and
an information processing apparatus that provides a service to the client apparatus in response to a request signal,
wherein the information processing apparatus includes a first memory and a first processor coupled to the first memory and configured to
transmit an error signal to the client apparatus in a case where permission to use the service is not valid with respect to the request signal, and
wherein the diem apparatus includes a second memory and a second processor coupled to the second memory and configured to
delete, in response to the error signal, permission information stored in the client apparatus and indicating that the service is available,
wherein the information processing system further comprises:
an authentication apparatus, the authentication apparatus including a third memory and a third processor coupled to the third memory and configured to authenticate the client apparatus, and
wherein the second processor is configured to transmit the request signal to the authentication apparatus,
the third processor is configured to transmit authentication information to the information processing apparatus in response to the request signal, the authentication information indicating whether the permission to use the service is valid,
the request signal includes an authentication ticket indicating whether the service is available from the client apparatus,
the third processor is further configured to delete the authentication ticket from the request signal in a case where the authentication ticket indicates that the service is unavailable, and transmit the request signal, from which the authentication ticket has been deleted, to the information processing apparatus, and the first processor is further configured to transmit the error signal to the client apparatus in a case where the authentication ticket is not included in the request signal.

2. The information processing system according to claim 1, wherein the second processor is further configured to output information indicating that the permission information has been deleted.

3. An information processing apparatus that provides a service to a client apparatus in response to a request signal, the information processing apparatus, a client apparatus and an authentication apparatus forming an information processing system,
the information processing apparatus comprising:
a first memory and a first processor coupled to the first memory and configured to
transmit an error signal to the client apparatus a case where permission to use the service is not valid; and
transmit authentication information to the error signal transmitter in response to the request signal, the authentication information indicating whether the permission to use the service is valid,
wherein the client apparatus includes a second memory and a second processor coupled to the second memory and configured to delete, in response to the error signal, permission information stored in the client apparatus and indicating that the service is available,
the second processor is configured to transmit the request signal to the authentication apparatus,
wherein the authentication apparatus includes a third memory and a third processor coupled to the third memory and configured to authenticate the client apparatus,
the third processor is configured to transmit authentication information to the information indicating whether the permission to use the service is valid,
the request signal includes an authentication ticket indicating whether the service is available from the client apparatus,
the third processor is further configured to delete the authentication ticket from the request signal in a case where the authentication ticket indicates that the service is unavailable, and transmit the request signal, from which the authentication ticket has been deleted, to the information processing apparatus, and
the first processor is further configured to transmit the error signal to the client apparatus in a case where the authentication ticket is not included in the request signal.

4. An information processing method performed by an information processing system including a client apparatus, an information processing apparatus that provides a service to the client apparatus in response to a request signal and an authentication apparatus configured to authenticate the client apparatus, the method comprising:
transmitting, by the information processing apparatus, an error signal to the client apparatus in a case where permission to use the service is not valid with respect to the request signal, and
deleting, by the client apparatus, permission information stored in the client apparatus and indicating that the service is available, in response to the error signal,
wherein the method further comprising:
authenticating, by the authentication apparatus, the client apparatus, transmitting, by the client apparatus, the request signal to the authentication apparatus, and transmitting, by the authentication apparatus, authentication information to the information processing apparatus in response to the request signal, the authentication information indicating whether the permission to use the service is valid, wherein the request signal includes an authentication ticket indicating whether the service is available from the client apparatus, wherein the method further comprising deleting, by the authentication apparatus, the authentication ticket from the request signal in a case where the authentication ticket indicates that the service is unavailable, and transmitting, by the authentication apparatus, the request signal, from which the authentication ticket has been deleted, to the information processing apparatus, and transmitting, by the information processing apparatus, the error signal to the client apparatus in a case where the authentication ticket is not included in the request signal.

\* \* \* \* \*